(12) United States Patent
Uchino et al.

(10) Patent No.: US 10,912,125 B2
(45) Date of Patent: Feb. 2, 2021

(54) MOBILE STATION

(71) Applicant: NTT DOCOMO, INC., Tokyo (JP)

(72) Inventors: Tooru Uchino, Tokyo (JP); Kazuki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/427,788

(22) Filed: May 31, 2019

(65) Prior Publication Data

US 2019/0289641 A1   Sep. 19, 2019

Related U.S. Application Data

(63) Continuation of application No. 15/032,689, filed as application No. PCT/JP2014/078440 on Oct. 27, 2014, now abandoned.

(30) Foreign Application Priority Data

Oct. 31, 2013  (JP) .................................. 2013-226946

(51) Int. Cl.
*H04W 4/00* (2018.01)
*H04W 74/08* (2009.01)
(Continued)

(52) U.S. Cl.
CPC ......... *H04W 74/0833* (2013.01); *H04L 5/001* (2013.01); *H04W 52/146* (2013.01);
(Continued)

(58) Field of Classification Search
CPC ... H04W 5/001; H04W 52/50; H04W 52/146; H04W 52/40; H04W 52/38;
(Continued)

(56) References Cited

U.S. PATENT DOCUMENTS

2012/0057547 A1* 3/2012 Lohr .................... H04L 5/0007
 370/329
2012/0209442 A1 8/2012 Ree
 (Continued)

FOREIGN PATENT DOCUMENTS

JP     2013529403 A    7/2013
WO   2013/179590 A1   12/2013

OTHER PUBLICATIONS

International Search Report issued in corresponding application No. PCT/JP2014/078440 dated Jan. 6, 2015 (2 pages).

(Continued)

*Primary Examiner* — Thai D Hoang
(74) *Attorney, Agent, or Firm* — Osha Bergman Watanabe & Burton

(57) ABSTRACT

A mobile station is disclosed including a processor that, in Carrier Aggregation using component carriers that are under the control of a master radio base station and a secondary radio base station, when a plurality of random access procedures are started, and when simultaneous transmission of random access preambles occurs in the plurality of random access procedures, performs a ramping control on a transmission power of a random access preamble in a random access procedure that is assigned priority and does not perform the ramping control on a transmission power of a random access preamble in the random access procedure other than the random access procedure that is assigned priority, a receiver that receives signals from the master radio base station and the secondary radio base station, and a transmitter that transmits signals to the master radio base station and the secondary radio base station.

3 Claims, 3 Drawing Sheets

(51) Int. Cl.

| | | |
|---|---|---|
| *H04W 52/50* | (2009.01) | |
| *H04W 52/14* | (2009.01) | |
| *H04L 5/00* | (2006.01) | |
| *H04W 52/40* | (2009.01) | |
| *H04W 52/38* | (2009.01) | |
| *H04W 72/12* | (2009.01) | |
| *H04W 74/00* | (2009.01) | |
| *H04W 52/28* | (2009.01) | |
| *H04W 52/36* | (2009.01) | |
| *H04W 52/34* | (2009.01) | |
| *H04W 76/15* | (2018.01) | |
| *H04W 88/12* | (2009.01) | |

(52) U.S. Cl.
CPC ........... *H04W 52/38* (2013.01); *H04W 52/40* (2013.01); *H04W 52/50* (2013.01); *H04W 72/1263* (2013.01); *H04W 52/281* (2013.01); *H04W 52/34* (2013.01); *H04W 52/346* (2013.01); *H04W 52/367* (2013.01); *H04W 74/002* (2013.01); *H04W 76/15* (2018.02); *H04W 88/12* (2013.01)

(58) Field of Classification Search
CPC . H04W 52/281; H04W 52/34; H04W 52/346; H04W 52/367; H04W 74/0833; H04W 74/002; H04W 76/15; H04W 88/12
USPC ........ 370/329–330, 335–337, 341, 343–348, 370/395.42–395.43
See application file for complete search history.

(56) References Cited

U.S. PATENT DOCUMENTS

| | | | |
|---|---|---|---|
| 2012/0224552 A1* | 9/2012 | Feuersanger | H04L 5/0007 370/329 |
| 2012/0307821 A1 | 12/2012 | Kwon et al. | |
| 2013/0058315 A1* | 3/2013 | Feuersanger | H04W 52/281 370/336 |
| 2013/0064165 A1 | 3/2013 | Chen et al. | |
| 2013/0064195 A1 | 3/2013 | Chang | |
| 2013/0250888 A1* | 9/2013 | Lu | H04W 72/0453 370/329 |
| 2013/0250925 A1* | 9/2013 | Lohr | H04W 72/0446 370/336 |
| 2013/0322339 A1 | 12/2013 | Ohta et al. | |
| 2013/0336160 A1 | 12/2013 | Yin et al. | |
| 2014/0023030 A1 | 1/2014 | Jeong et al. | |
| 2014/0029586 A1* | 1/2014 | Loehr | H04W 56/0005 370/336 |
| 2014/0286305 A1 | 9/2014 | Yamada | |
| 2015/0036617 A1 | 2/2015 | Guo et al. | |
| 2015/0117342 A1* | 4/2015 | Loehr | H04W 72/1284 370/329 |

OTHER PUBLICATIONS

Written Opinion of the International Searching Authority issued in corresponding application No. PCT/JP2014/078440 dated Jan. 6, 2015 (3 pages).

InterDigital Communications, "Physical Layer Aspects of Dual Connectivity"; 3GPP TSG-RAN WG1 #74, Tdoc R1-133396; Barcelona, Spain; Aug. 19-23, 2013 (4 pages).

Samsung, "Random Access on SCell in inter-ENB CA"; 3GPP TSG-RAN WG2 Meeting #83bis, R2-133269; Ljubljana, Slovenia; Oct. 7-11, 2013 (3 pages).

Huawei, HiSilicon, "Throughput results for inter-frequency deployment of small cells"; 3GPP TSG-RAN WG2 Meeting #82, R2-131782; Fukuoka, Japan; May 20-24, 2013 (5 pages).

Japanese Office Action issued in Japanese application No. JP2013-226946 entitled, "Notification of Reasons for Refusal", dated Dec. 25, 2015 (7 pages).

Ericsson, "Random Access for dual connectivity"; 3GPP TSG-RAN WG2 #83bis, Tdoc R2-133431; Ljubljana, Slovenia; Oct. 7-11, 2013 (2 pages).

Extended European Search Report issued in the counterpart European Patent Application No. 14856903.1, dated Sep. 26, 2016 (10 pages).

LG Electronics Inc.; "Issues on RA procedure for dual connectivity"; 3GPP TSG-RAN2 Meeting #83bis, R2-133540; Ljubljana, Slovenia; Oct. 7-11, 2013 (3 pages).

Office Action issued in corresponding European Patent Application No. 14856903.1, dated Jun. 2, 2017 (6 pages).

* cited by examiner

MOBILE STATION

CROSS-REFERENCE TO RELATED APPLICATIONS

The present application is a Continuation Application and, thereby, claims benefit under 35 U.S.C. § 120 to U.S. application Ser. No. 15/032,689, filed on Apr. 28, 2016, titled, "MOBILE STATION AND MOBILE COMMUNICATION SYSTEM FOR PERFORMING SIMULTANEOUS COMMUNICATION USING COMPONENT CARRIERS UNDER THE CONTROL OF A MASTER BASE STATION AND SECONDARY BASE STATION," which is a U.S. National Stage Application of PCT Application No. PCT/JP2014/078440, filed on Oct. 27, 2014, which claims priority to Japanese Patent Application No. 2013-226946, filed on Oct. 31, 2013. The contents of the priority applications are incorporated by reference in their entirety.

TECHNICAL FIELD

The present invention relates to a mobile station and a mobile communication system.

BACKGROUND ART

In CA (Carrier Aggregation) stipulated till Release-10 of the LTE system, as shown in FIG. 4(a), high throughput could be achieved by performing a simultaneous communication using CC (Component Carrier) #1 and CC #2 under the control of a same radio base station eNB.

On the other hand, in Release-12 of the LTE system, the CA used till Release-10 of the LTE system has been expanded, and, as shown in FIG. 4(b), performing "Inter-eNB CA (or Inter-node UP aggregation)" is being studied (see Non-Patent Document 1). The "Inter-eNB CA" is a simultaneous communication using CC #1 and CC #2 that are under the control of different radio base stations eNB #1 and eNB #2, and can achieve high throughput.

For example, if all the CCs cannot be accommodated under a single radio base station eNB, to achieve a throughput equivalent to Release-10 of the LTE system, the "Inter-eNB CA" is required to be performed.

RELATED ART DOCUMENT

Non-Patent Document

Non-Patent Document 1: 3GPP Contribution R2-131782

SUMMARY OF THE INVENTION

In the "Inter-eNB CA" in the conventional LTE system, because MAC (Media Access Control) scheduler exists independently for every CC, it is necessary to transmit BSR (Buffer Status Report) to a radio base station eNB corresponding to the each CC.

Moreover, each radio base station eNB is assumed to independently start RACH (Random Access Channel) procedure.

Therefore, it is assumed that plural (a plurality of) RACH procedures are simultaneously triggered for a single mobile station UE.

However, it is stipulated that the existing mobile station UE always performs only one RACH procedure. Therefore, there was a problem that what transmission power control should be performed when plural RACH procedures are simultaneously started was not defined.

The present invention has been made in view of the above circumstances. It is an object of the present invention to provide a mobile station and a mobile communication system that are capable of performing an appropriate transmission power control when plural RACH procedures are simultaneously started.

According to a first aspect of the present invention, a mobile station capable of performing a carrier aggregation by using a master radio base station and a secondary radio base station, includes a controlling unit that, in the carrier aggregation, when plural random access procedures are started, performs a prioritized control based on a predetermined rule on a transmission power control in each of the plural random access procedures.

According to a second aspect of the present invention, a mobile station capable of performing a carrier aggregation by using a master radio base station and a secondary radio base station, includes a controlling unit that selects, in the carrier aggregation, when plural random access procedures are started, and when simultaneous transmission of random access preambles occurs in the plural random access procedures and when at least one of the random access procedures in which the simultaneous transmission occurs is a contention based random access procedure, a combination of random access preambles for which a value of MPR or P-MPR is smallest.

According to a third aspect of the present invention, a mobile communication system in which a mobile station is capable of performing a carrier aggregation by using a master radio base station and a secondary radio base station, the master radio base station or the secondary radio base station sets to the mobile station a random access preamble sequence for simultaneous transmission and a random access preamble sequence for non-simultaneous transmission, and the mobile station uses, in the carrier aggregation, when plural random access procedures are started, and when simultaneous transmission of random access preambles occurs in the plural random access procedures, the random access preamble sequence for simultaneous transmission.

According to a fourth aspect of the present invention, a mobile communication system in which a mobile station is capable of performing a carrier aggregation by using a master radio base station and a secondary radio base station, the master radio base station or the secondary radio base station adjusts, in the carrier aggregation, so that simultaneous transmission of random access preambles in plural random access procedures does not occur, a resource in a time direction for transmitting a random access preamble assigned to the mobile station.

MODES FOR CARRYING OUT THE INVENTION

Mobile Communication System According to First Embodiment of Present Invention

Figure 1:
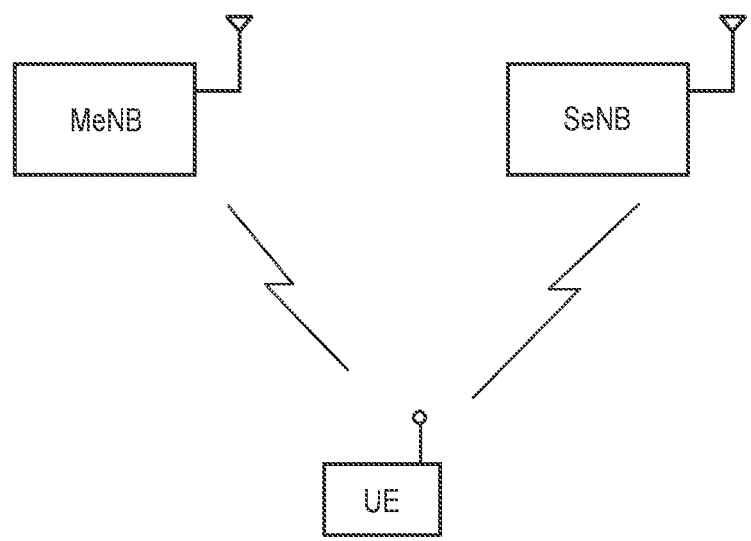
FIG. 1 is an overall structural diagram of a mobile communication system according to a first embodiment of the present invention.
Figure 2:
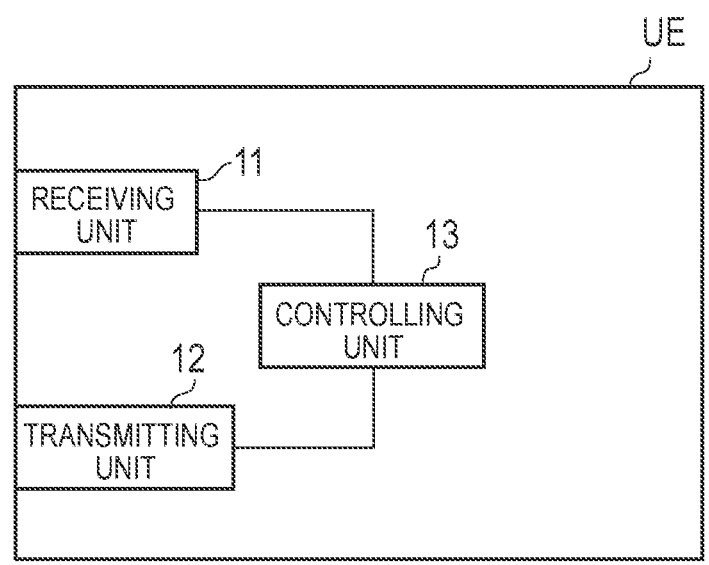
FIG. 2 is a functional block diagram of a mobile station according to the first embodiment of the present invention.
Figure 3:
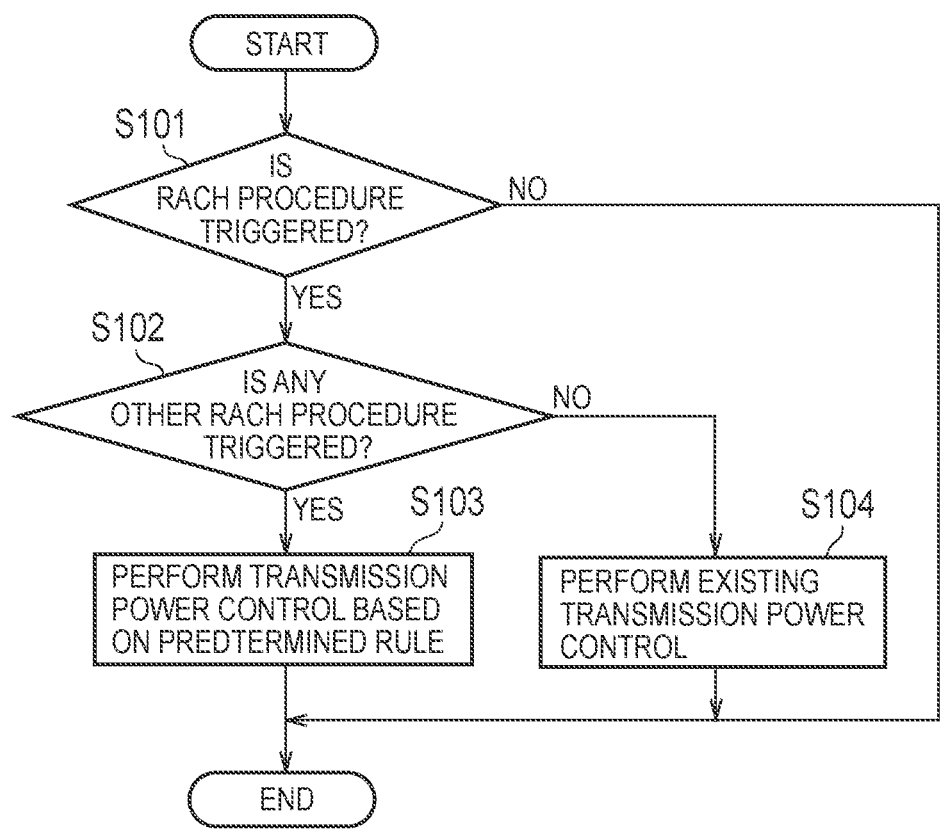
FIG. 3 is a flow chart for explaining an operation of the mobile station according to the first embodiment of the present invention.
Figure 4A:
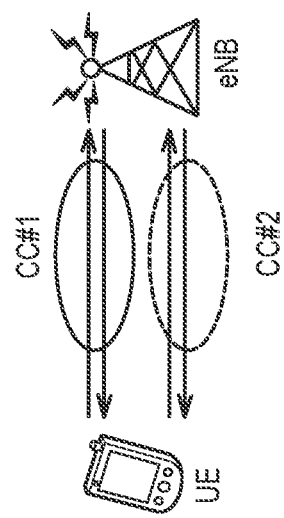
FIG. 4A and FIG. 4B are views for explaining carrier aggregation.
Figure 4B:
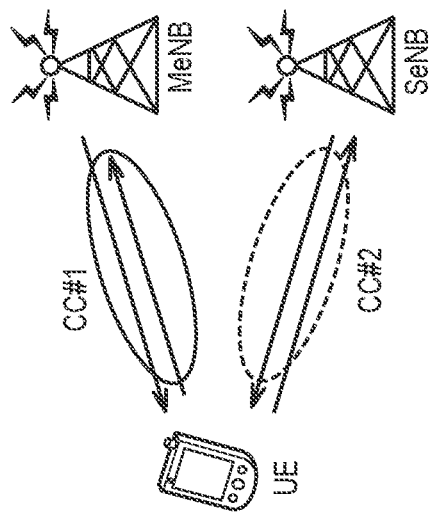

Referring to FIGS. 1 to 3, a mobile communication system according to a first embodiment of the present invention is explained below.

The mobile communication system according to the present embodiment is a mobile communication system of the LTE system (or, LTE-Advanced system). As shown in FIG. 1, the mobile communication system includes a radio base station MeNB (a master radio base station), and a radio base station SeNB (a secondary radio base station).

In the mobile communication system according to the present embodiment, a mobile station UE is capable of performing the "Inter-eNB CA" by using the radio base station MeNB and the radio base station SeNB.

As shown in FIG. 2, the mobile station UE according to the present embodiment includes a receiving unit 11, a transmitting unit 12, and a controlling unit 13.

The receiving unit 11 is configured to receive various signals from the radio base stations MeNB and SeNB. The transmitting unit 12 is configured to transmit various signals to the radio base stations MeNB and SeNB.

The controlling unit 13 is configured to perform, during the "Inter-eNB CA", when plural RACH procedures are started, a prioritized control based on a predetermined rule on a transmission power control in each of the plural RACH procedures.

For example, the controlling unit 13 can perform, as the prioritized control, on a transmission power control, a prioritized control based on priority explicitly instructed by the radio base station MeNB or the radio base station SeNB.

Further, the instructions by the radio base station MeNB or the radio base station SeNB can be transmitted via any layer such as RRC layer, MAC layer, or a physical layer.

Moreover, the controlling unit 13 can give priority in the prioritized control to a transmission power control in RACH procedure between the radio base station MeNB.

The controlling unit 13 can give, when plural radio base stations SeNB exist, priority in the prioritized control to a transmission power control in RACH procedure between a radio base station SeNB among plural radio base stations SeNB having a lower "eNBIndex".

Alternatively, the controlling unit 13 can give priority in the prioritized control to a transmission power control in RACH procedure between the radio base station MeNB or the radio base station SeNB in which SRB (Signaling Radio Bearer) has been set.

Alternatively, the controlling unit 13 can give priority in the prioritized control to a transmission power control in RACH procedure in Pcell (Primary cell).

Alternatively, the controlling unit 13 can give, when plural Scells (Secondary cell) exist, priority in the prioritized control to a transmission power control in RACH procedure in "Special cell" among the plural Scells.

The "Special cell" can be a cell that is always in an active state, can be a cell that supports "Contention based RACH procedure", can be a cell that has been set in the radio base station SeNB for the first time, or can be a cell in which RLM (Radio Link Monitoring) has been set.

Alternatively, the controlling unit 13 can give priority in the prioritized control to a transmission power control in "Non-contention based RACH procedure" (non-contention based random access procedure).

Alternatively, the controlling unit 13 can give priority in the prioritized control to a transmission power control in RACH procedure with a high transmission frequency of random access preamble (in other words, RACH procedure with a high power ramping frequency).

Alternatively, the controlling unit 13 can give priority in the prioritized control to a transmission power control in RACH procedure for PRACH (Physical Random Access Channel) specified from a network.

For example, the controlling unit 13 can lower, in the prioritized control, the priority of RACH procedure that is autonomously started by the mobile station UE based on "UL data resuming procedure".

Alternatively, the controlling unit 13 can give priority in the prioritized control to a transmission power control in RACH procedure for CCCH (Common Control Channel). For example, the CCCH is used to perform a reconnection procedure.

Specifically, the controlling unit 13 can perform, when simultaneous transmission of random access preambles occurs in the plural RACH procedures, a ramping control (Power ramping) in the prioritized control on a transmission power of a random access preamble in the RACH procedure that is given priority, but cannot perform the ramping control (Power ramping) on a transmission power of a random access preamble in the RACH procedure other than the RACH procedure that is given priority.

The controlling unit 13 can increase, in such a situation, the transmission frequency of random access preamble higher than the transmission frequency of random access preamble in a common RACH procedure.

Alternatively, the controlling unit 13 cannot transmit, when simultaneous transmission of random access preambles occurs in the plural RACH procedures, a random access preamble in RACH procedure other than the RACH procedure that is given priority.

Referring now to FIG. 3, an example of the detailed operation of the mobile station UE according to the present embodiment is explained below.

As shown in FIG. 3, the mobile station UE detects, at Step S101, a trigger for starting RACH procedure, and then determines, at Step S102, whether or not other RACH procedure has been started.

If the determination result is "Yes", the operation advances to Step S103, and if the determination result is "No", the operation advances to Step S104.

At Step S103, the mobile station UE performs a prioritized control based on a predetermined rule on a transmission power control in each of the plural RACH procedures.

On the other hand, at Step S104, the mobile station UE performs a transmission power control in the existing RACH procedure (refer to chapter 6.1 of 3GPP TS36.213).

Modification 1

A mobile communication system according to a first modification of the present invention is explained below while focusing on the points of difference with the mobile communication systems according to the first embodiment.

In the mobile communication system according to the first modification, the controlling unit 13 of the mobile station UE can select, in the "Inter-eNB CA", when plural RACH procedures are started, and when simultaneous transmission of the random access preamble occurs in "Contention based RACH procedure" among the plural RACH procedures, a combination of random access preambles for which a value of P-MPR (Power-management-Maximum Power Reduction) (or, a value of MPR) stipulated in Chapter 6.2.5 of 3GPP TS36.101 is the smallest.

In other words, the controlling unit 13 selects, in the "Inter-eNB CA", when plural random access procedures are started, and when simultaneous transmission of random access preambles occurs in the plural random access procedures and when at least one of the random access procedures in which the simultaneous transmission occurs is a contention based random access procedure, a combination of random access preambles for which the value of MPR or P-MPR is the smallest.

The controlling unit 13 can autonomously select, in the "Contention based RACH procedure", a combination of CC for the PRACH or a random access preamble sequence (PRACH sequence) for which the value of P-MPR is the smallest.

Modification 2

A mobile communication system according to a second modification of the present invention is explained below while focusing on the points of difference with the mobile communication system according to the first embodiment.

In the mobile communication system according to the second modification, the radio base station MeNB or the radio base station SeNB sets beforehand to the mobile station UE a random access preamble sequence (PRACH sequence) for simultaneous transmission and a random access preamble sequence (PRACH sequence)for non-simultaneous transmission.

For example, the radio base station MeNB or the radio base station SeNB can use, in the random access preamble sequence for simultaneous transmission, "Preamble group B" that is transmitted with a lower transmission power and can use, in the random access preamble sequence for non-simultaneous transmission, "Preamble group A".

The controlling unit 13 in the mobile station UE uses, in the "Inter-eNB CA", when plural RACH procedures are started, and when simultaneous transmission of random access preambles occurs in the plural RACH procedures, the random access preamble sequence for simultaneous transmission.

Modification 3

A mobile communication system according to a third modification of the present invention is explained below while focusing on the points of difference with the mobile communication system according to the first embodiment.

In the mobile communication system according to the third modification, the radio base station MeNB or the radio base station SeNB can adjust, in the "Inter-eNB CA", a resource in a time direction for transmitting random access preambles assigned to the mobile station UE so that simultaneous transmission of random access preambles in the plural random access procedures does not occur.

The characteristics of the present embodiment explained above can be expressed as follows.

According to a first aspect of the present embodiment, a mobile station UE is capable of performing the "Inter-eNB CA (carrier aggregation)" by using a radio base station MeNB (master radio base station) and a radio base station SeNB (secondary radio base station), and includes a controlling unit 13 that, in the "Inter-eNB CA", when plural RACH procedures (random access procedure) are started, performs a prioritized control based on a predetermined rule on a transmission power control in each of the plural RACH procedures.

According to the above aspect, an appropriate transmission power control can be performed when plural RACH procedures are simultaneously started.

In the first aspect of the present embodiment, the controlling unit 13 can give priority in the prioritized control to a transmission power control in RACH procedure between the radio base station MeNB.

According to the above aspect, when plural RACH procedures are simultaneously started, the transmission power control in the RACH procedure between radio base station MeNB that plays an important role in the "Inter-eNB" can be given priority.

In the first aspect of the present embodiment, the controlling unit 13 can give priority in the prioritized control to a transmission power control in RACH procedure between the radio base station eNB (MeNB or SeNB) in which SRB (signaling radio bearer) has been set.

According to the above aspect, when plural RACH procedures are simultaneously started, the transmission power control in the RACH procedure between the radio base station in which the SRB that is important for performing communication has been set can be given priority.

In the first aspect of the present embodiment, the controlling unit 13 can give priority in the prioritized control to a transmission power control in RACH procedure in Pcell (Primary cell).

According to the above aspect, when plural RACH procedures are simultaneously started, the transmission power control in the RACH procedure in the Pcell that plays an important role in the "Inter-eNB", can be given priority.

In the first aspect of the present embodiment, the controlling unit 13 can give priority in the prioritized control to a transmission power control in the "Non-contention based RACH procedure (Non-contention based Random Access procedure)".

According to the above aspect, when plural RACH procedures are simultaneously started, the transmission power control in the "Non-contention based RACH procedure" that is started by a network's initiative can be given priority.

In the first aspect of the present embodiment, the controlling unit 13 can give priority in the prioritized control to a transmission power control in RACH procedure with a high transmission frequency of random access preamble.

According to the above aspect, when plural RACH procedures are simultaneously started, a transmission power control in RACH procedure that has been re-transmitting the random access preamble can be given priority.

In the first aspect of the present embodiment, the controlling unit 13 can give priority in the prioritized control to a transmission power control in RACH procedure for CCCH.

According to the above aspect, when plural RACH procedures are simultaneously started, a transmission power control in RACH procedure pertaining to a reconnection procedure can be given priority.

In the first aspect of the present embodiment, the controlling unit 13, when simultaneous transmission of random access preambles occurs in the plural RACH procedures, can perform a ramping control on a transmission power of a random access preamble in RACH procedure that is given priority and cannot perform the ramping control on a transmission power of a random access preamble in the RACH procedure other than the random access procedure that is given priority.

According to the above aspect, even when simultaneous transmission of random access preambles occurs in plural RACH procedures started simultaneously, a transmission power control in each of the plural RACH procedures can be appropriately performed.

In the first aspect of the present embodiment, the controlling unit 13, when simultaneous transmission of random access preambles occurs in plural RACH procedures, cannot transmit a random access preamble in RACH procedure other than the RACH procedure that is given priority.

According to the above aspect, even when simultaneous transmission of random access preambles occurs in plural RACH procedures started simultaneously, a transmission power control in each of the plural RACH procedures can be appropriately performed.

According to a second aspect of the present embodiment, a mobile station UE capable of performing the "Inter-eNB CA" by using a radio base station MeNB and a radio base station SeNB, includes a controlling unit 13 that selects, in the "Inter-eNB CA", when plural RACH procedures are started, and when simultaneous transmission of random access preambles occurs in the plural RACH procedures and when at least one of the RACH procedures in which the simultaneous transmission occurs is the "Contention based RACH procedure (contention based random access procedure)", a combination of random access preambles for which a value of MPR or P-MPR is smallest.

According to the above aspect, because an power offset value becomes smaller, a probability of occurrence of a power being kept at the maximum value (in other words, continuation of a state in which a required transmission power in the mobile station UE reaches at the maximum transmission power Pmax) when plural RACH procedures are started, can be reduced.

According to a third aspect of the present embodiment, a mobile communication system includes a mobile station UE that is capable of performing the "Inter-eNB CA" by using a radio base station MeNB and a radio base station SeNB. The radio base station MeNB or the radio base station SeNB sets, to the mobile station UE, a random access preamble sequence for simultaneous transmission and a random access preamble sequence for non-simultaneous transmission. The mobile station UE uses, in the "Inter-eNB CA", when plural RACH procedures are started, and when simultaneous transmission of random access preambles occurs in the plural RACH procedures, the random access preamble sequence for simultaneous transmission.

According to the above aspect, because a power offset value becomes smaller, the probability of occurrence of a power being kept at the maximum value when plural RACH procedures are started, is reduced.

According to a fourth aspect of the present embodiment, a mobile communication system includes a mobile station UE that is capable of performing the "Inter-eNB CA" by using a radio base station MeNB and a radio base station SeNB. The radio base station MeNB or the radio base station SeNB adjusts, in the "Inter-eNB CA", a resource in a time direction for transmitting a random access preamble assigned to the mobile station UE so that simultaneous transmission of random access preambles in plural RACH procedures does not occur.

According to the above aspect, the mobile communication system can be configured to prevent simultaneous transmission of random access preambles.

The operations of the mobile station UE, and the radio base stations MeNB and SeNB can be realized by hardware, can be realized by a software module executed by a processor, or can be realized by the combination of these.

The software module can be stored in a storage medium having a desired form such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, a CD-ROM, and the like.

The storage medium is connected to a processor so that the processor can read/write information from/in the storage medium. Alternatively, the storage medium can be integrated in a processor. Alternatively, the storage medium and the processor can be arranged in ASIC. The ASIC can be arranged in the mobile station UE, and the radio base station MeNB, SeNB. The storage medium and the processor can be arranged as a discrete component in the mobile station UE, and the radio base station MeNB, SeNB.

The present invention has been explained in detail by using the above mentioned embodiments; however, it is obvious for a person skilled in the art that the present invention is not limited to the embodiments explained in the present description. The present invention can be implemented by way of modifications and changes without deviating from the gist and the range of the present invention specified by the claims. Accordingly, the indication of the present description aims at exemplary explanation, and has no intention to limit to the present invention.

INDUSTRIAL APPLICABILITY

As explained above, according to the present invention, it is possible to provide a mobile station and a mobile communication system that are capable of appropriately performing a transmission power control when plural RACH procedures are simultaneously started.

EXPLANATION OF REFERENCE NUMERALS

UE Mobile station
MeNB, SeNB Radio base station
11 Receiving unit
12 Transmitting unit
13 Controlling unit

The invention claimed is:

1. A mobile station comprising:
a processor that, in Carrier Aggregation using component carriers that are under the control of a master radio base station and a secondary radio base station, when a plurality of random access procedures are started, and when simultaneous transmission of random access preambles occurs in the plurality of random access procedures, performs a ramping control on a transmission power of a random access preamble in a random access procedure that is assigned priority and does not perform the ramping control on a transmission power of a random access preamble in the random access procedure other than the random access procedure that is assigned priority,
a receiver that receives signals from the master radio base station and the secondary radio base station; and
a transmitter that transmits signals to the master radio base station and the secondary radio base station,
wherein priority is assigned to a transmission power control in a random access procedure to minimize a total power of transmissions of a predetermined maximum power.

2. The mobile station as claimed in claim 1, wherein the processor gives priority to a transmission power control in a random access procedure in a primary cell.

3. A mobile station comprising:
a processor that, in Carrier Aggregation using component carriers that are under the control of a master radio base station and a secondary radio base station, performs a ramping control on a transmission power of a random access preamble in a random access procedure;

a receiver that receives signals from the master radio base station and the secondary radio base station; and a transmitter that transmits signals to the master radio base station and the secondary radio base station.

\* \* \* \* \*